(12) United States Patent
Baek

(10) Patent No.: US 7,350,757 B2
(45) Date of Patent: Apr. 1, 2008

(54) PUSH TYPE CUP HOLDER

(75) Inventor: Seung Woo Baek, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 10 days.

(21) Appl. No.: 11/470,323

(22) Filed: Sep. 6, 2006

(65) Prior Publication Data

US 2007/0221805 A1    Sep. 27, 2007

(30) Foreign Application Priority Data

Mar. 22, 2006    (KR) .................. 10-2006-0026293

(51) Int. Cl.
*A47F 1/08*    (2006.01)
*B60R 7/00*    (2006.01)
(52) U.S. Cl. .............. 248/311.2; 224/281; 224/926
(58) Field of Classification Search ............. 248/311.2; 224/281, 539, 926; 297/188.17; 74/110, 74/63
See application file for complete search history.

(56) References Cited

U.S. PATENT DOCUMENTS

| | | | | |
|---|---|---|---|---|
| 5,171,061 | A | * | 12/1992 | Marcusen .............. 297/188.17 |
| 5,228,611 | A | * | 7/1993 | Yabuya ...................... 224/281 |
| 5,673,891 | A | * | 10/1997 | Fujihara et al. .......... 248/311.2 |
| 5,941,491 | A | * | 8/1999 | Plocher et al. ........... 248/311.2 |
| 6,010,047 | A | * | 1/2000 | Osborn ....................... 224/281 |
| 6,230,948 | B1 | * | 5/2001 | Steiger et al. .............. 224/539 |
| 6,464,187 | B1 | * | 10/2002 | Bieck et al. ............. 248/311.2 |
| 6,578,806 | B2 | * | 6/2003 | Dieringer et al. ........ 248/311.2 |
| 6,712,325 | B2 | | 3/2004 | Choi |

FOREIGN PATENT DOCUMENTS

| | | |
|---|---|---|
| KR | 10-0389546 | 6/2003 |
| KR | 10-2004-0084412 | 10/2004 |

OTHER PUBLICATIONS

English Language Abstract of KR 10-2004-0084412.
English Language Abstract of KR 10-2001-0021207.

* cited by examiner

*Primary Examiner*—Anita M. King
(74) *Attorney, Agent, or Firm*—Greenblum & Bernstein, P.L.C.

(57) ABSTRACT

Disclosed herein is a push type cup holder. The push type cup holder includes a stand unit provided at a lower side thereof with a rack gear, a base including a spur gear coupled thereto by use of a shaft to be gearedly engaged with the rack gear and a pinion gear disposed thereon to be connected to the shaft of the spur gear, a guide plate located above the base and including a driven rack gear provided at a lower side thereof to be gearedly engaged with the pinion gear and a plurality of supporting posts adapted to guide lifting and lowering of the stand unit, and a housing configured to receive the guide plate therein and formed at an inner peripheral surface thereof with guiding pats for allowing the supporting posts to be inserted and restricted therein in a movable manner, respectively. The stand unit can be lowered toward the guide plate, whereas the guide plate can be raised, so as to allow a cup to be stably seated on the guide plate.

4 Claims, 4 Drawing Sheets

PUSH TYPE CUP HOLDER

BACKGROUND OF THE INVENTION

1. Field of the Invention

The present invention relates to a push type cup holder, and more particularly, to a push type cup holder which is designed to be disposed in a passenger compartment of a vehicle and adapted to support a cup, which is seated thereinto upon receiving an external push force.

2. Description of the Related Art

Generally, a vehicle is provided, between a driver scat and a passenger seat, with a plurality of cup holders for receiving cups or beverage cans seated thereinto. These cup holders may be also provided at rear seats of a vehicle for allowing passengers to safely drink coffee or beverage.

Sometimes, a cup holder may take the form of a push type tray when it is desired to be mounted in a dashboard of a vehicle. However, it is known that the tray-shaped cup holder is inconvenient to be put into or taken out of the dashboard and there is a risk of beverage spilling due to sudden movements or shaking.

Considering the configuration of a conventional push type cup holder, it includes an upper panel for supporting a cup, a housing configured to surround the upper panel disposed therein, and a spring interposed between the upper panel and the housing and adapted to support the upper panel. In use, if the upper panel, on which a cup is placed, is manually pressed, the upper panel is inserted into die housing and kept in a fixed position, thus allowing the cup to be seated in the housing.

In the case of the conventional push type cup holder having the above described configuration, it is necessary to move the upper panel into the housing to be fixed in the housing while pressing the spring by use of the upper panel. However, pressing the upper panel by use of a cup during traveling of a vehicle may prevent a driver from concentrating on driving, and thus, increases the risk of accidents. Furthermore, the upper panel has to be lowered to a lower portion of the housing by a predetermined stroke, and therefore, there is a problem in that a time required to seat a cup in the housing is extended, resulting in deterioration in operation sensitivity.

SUMMARY OF THE INVENTION

Therefore, the present invention has been made in view of the above problems, and it is an object of the present invention to provide a push type cup holder which can guarantee safe accommodation of a cup within a passenger compartment of a vehicle and can be smoothly operated even when a slight contact pressure is applied instantaneously by the user's hand or cup, so as to rapidly create a cup accommodating space.

In accordance with the present invention, the above and other objects can be accomplished by the provision of a push type cup holder comprising: a stand unit provided at a lower side thereof with a rack gear; a base comprising a spur gear, which is coupled thereto by use of a shaft to be gearedly engaged with the rack gear, and a pinion gear which is disposed thereon to be connected to the shaft of the spur gear; a guide plate located above the base and comprising a driven rack gear provided at a lower side thereof to be gearedly engaged with the pinion gear and a plurality of supporting posts adapted to guide lifting and lowering of the stand unit; and a housing configured to receive the guide plate therein and formed at an inner peripheral surface thereof with guiding paths for allowing the supporting posts to be inserted and restricted therein in a movable manner, respectively.

Preferably, the stand unit may comprise: a stand plate adapted to support a cup within the housing and centrally formed with a through-hole, the rack gear being formed at a lower side of the stand plate; a supporting plate fitted in a lower portion of the through-hole of the stand plate and provided with a light emitting diode to irradiate light upward from the through-hole of the stand plate; a cover plate secured to an upper surface of the stand plate and formed with a through-hole communicating with the through-hole of the stand plate, the cover plate being adapted To produce a circular light loop along a rim thereof upon receiving the light irradiated from the light emitting diode; and a touch plate disposed in the through-hole of the cover plate to have a gap with the cover plate and adapted to diffuse the light irradiated from the light emitting diode to an outer peripheral region thereof.

Preferably, each of the supporting posts of the guide plate may comprise: a protruding receptacle protruded out of the housing and internally defining a space; a supporting panel coupled to the protruding receptacle by use of a shaft, the supporting panel being normally protruded onto the guide plate, but being pushed into the protruding receptacle as the stand unit is lowered so as to be again protruded out of the receptacle; and a linear spring having one end supported by the protruding receptacle and the other end supported by the supporting panel.

Preferably, the base may comprise a driven gear connected to the shaft of the spur gear, and the driven gear is gearedly engaged with a worm gear that is adapted to be rotated by a motor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
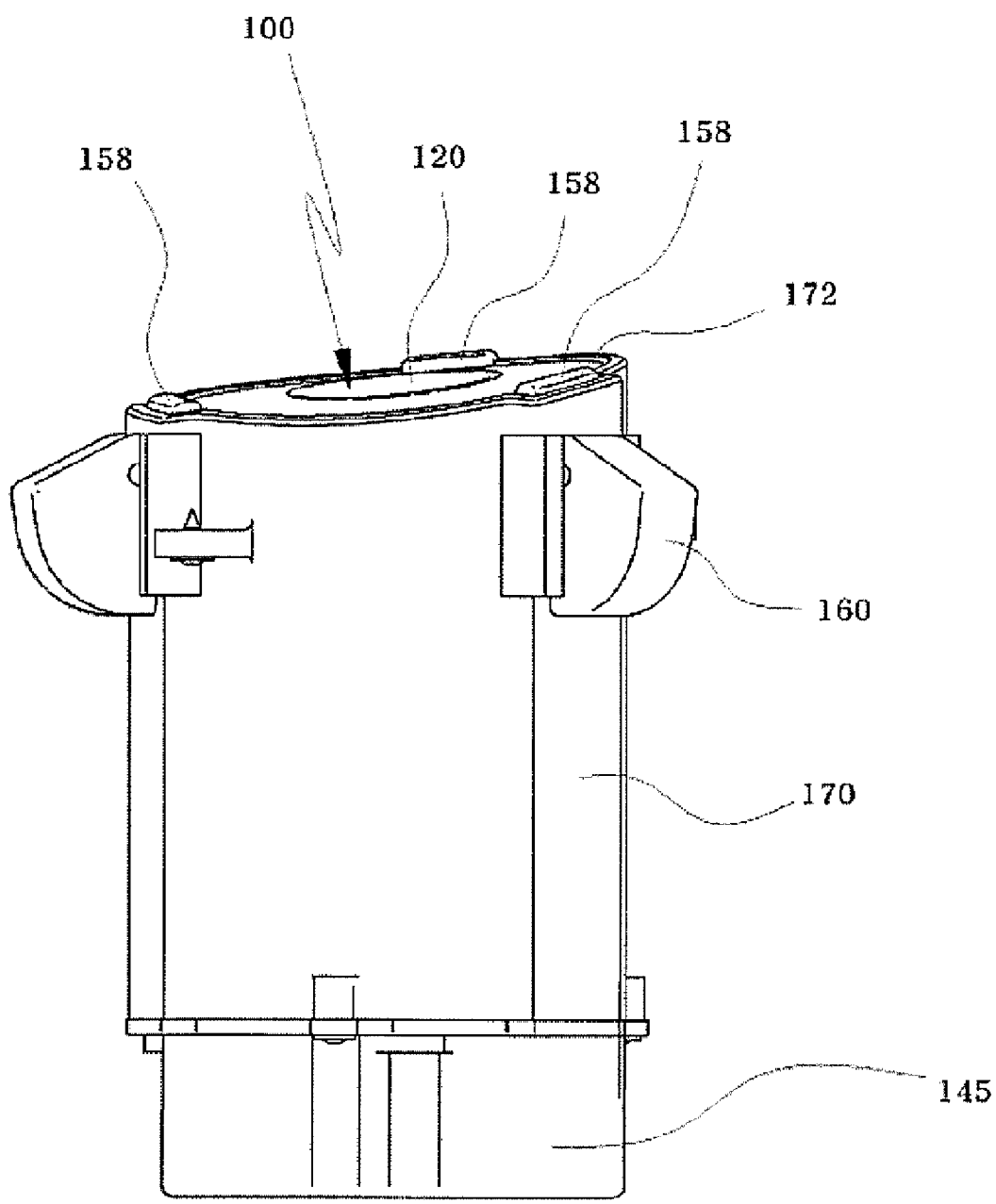
FIG. 1 is a perspective view illustrating a push type cup holder according to an embodiment of the present invention.
Figure 2:
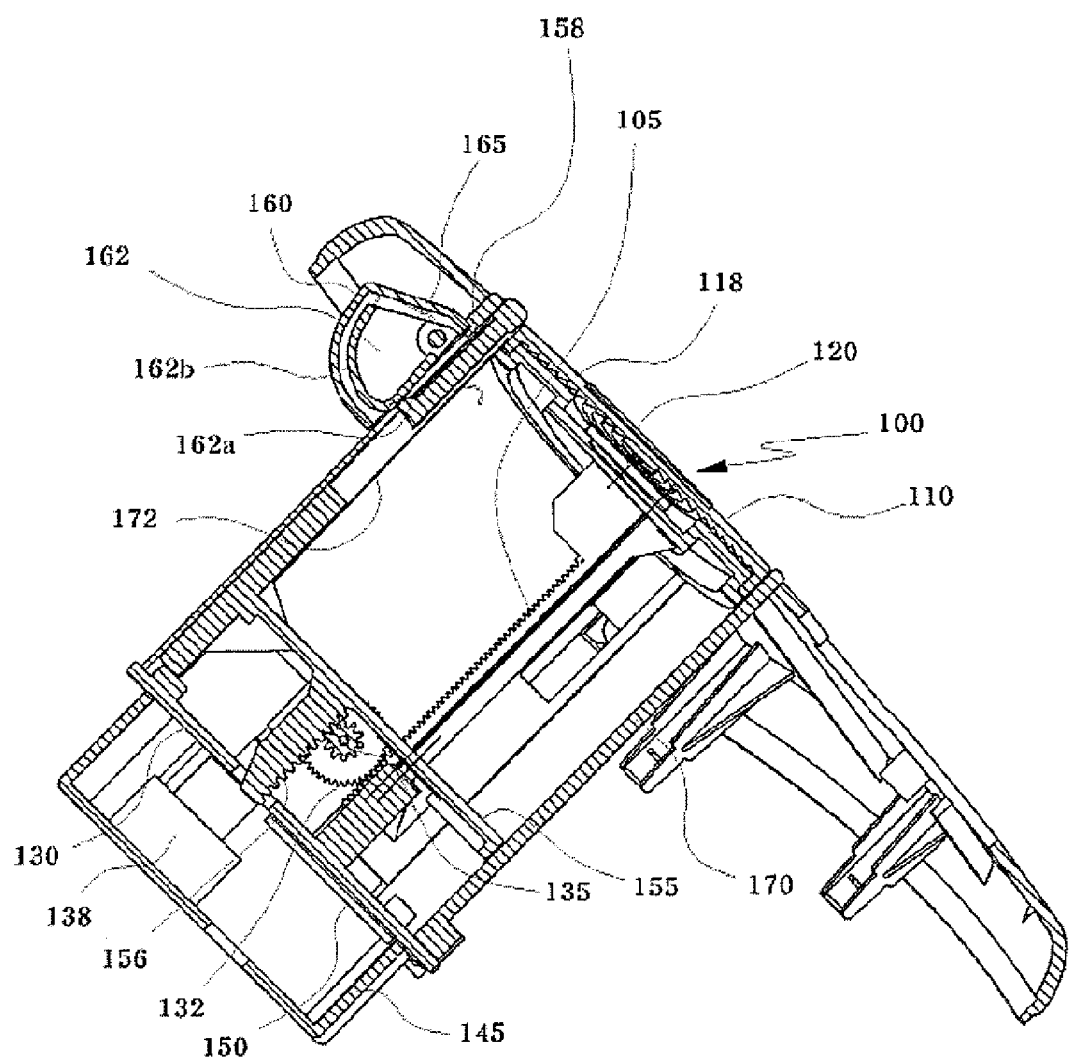
FIG. 2 is a sectional view of FIG. 1.
Figure 3:
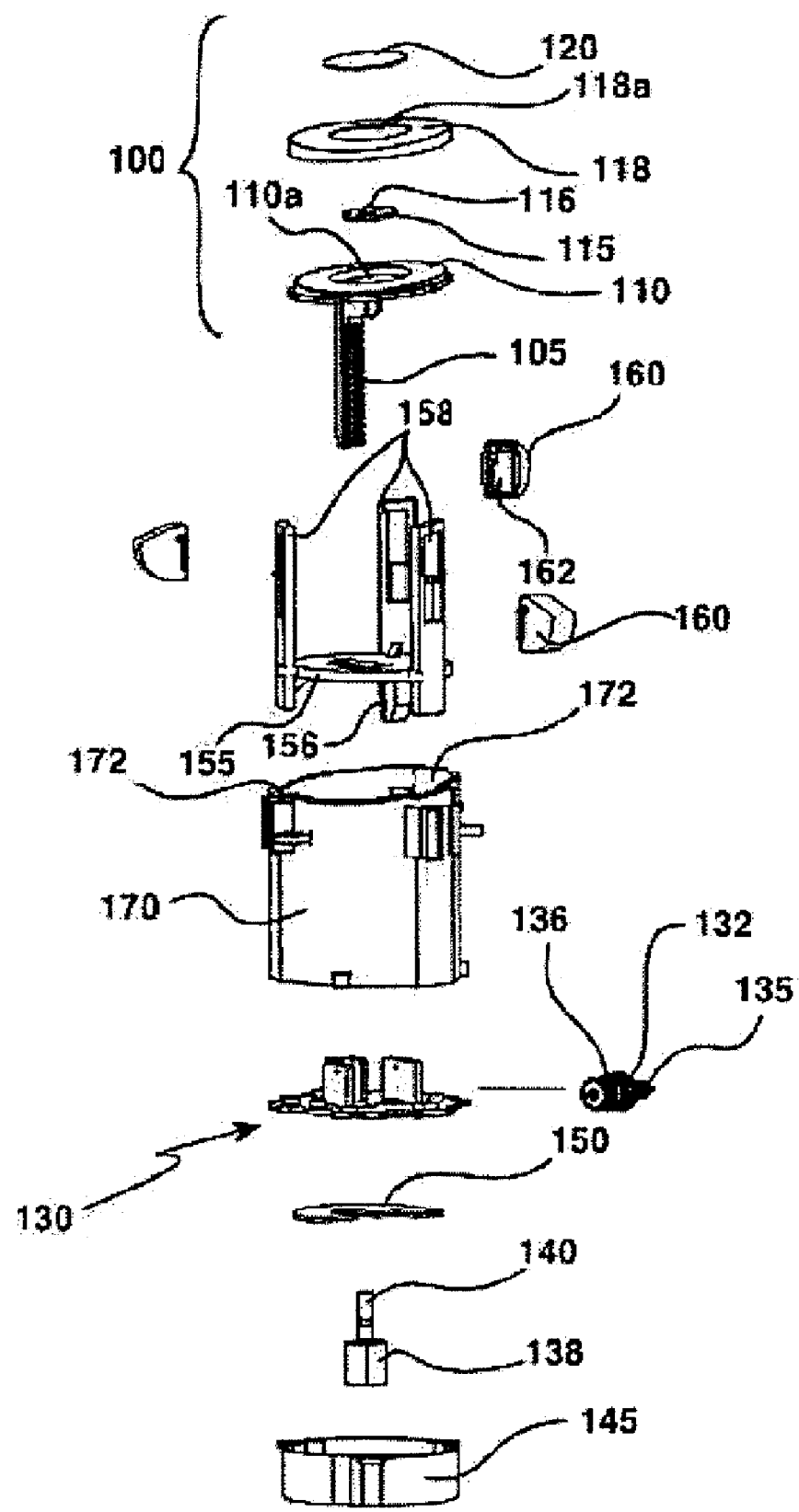
FIG. 3 is an exploded view of FIG. 2.

FIG. 1 is a perspective view illustrating a push type cup holder according to an embodiment of the present invention, FIG. 2 is a sectional view of FIG. 1, and FIG. 3 is an exploded view of FIG. 2.

As shown, the push type cup holder according to the embodiment of the present invention comprises a cup stand unit 100 for supporting a cup thereon, and a guide plate 155 adapted to guide the lifting and lowering of the cup stand unit 100 while being lowered and lifted inversely to the cup stand unit 100.

Specifically, the push type cup holder of the embodiment is a cup holder for fixedly holding a cup or beverage can within a vehicle. The push type cup holder comprises: the stand unit 100 provided at a lower side thereof with a rack gear 105; a base 130 including a spur gear 132, which is coupled thereto by use of a shaft and adapted to be gearedly engaged with the rack gear 105, and a pinon gear 135 disposed thereon to be connected to the shaft of the spur gear 132; the guide plate 155 located above the base 130 and including a driven rack gear 156 provided at a lower side thereof to be gearedly engaged with the pinion gear 135 and three supporting posts 158 adapted to guide lifting and lowering of the stand unit 100; and a housing 170 configured to receive the guide plate 155 therein and formed at an inner peripheral surface thereof with guiding paths 172 for allowing the supporting posts 158 to be equidistantly inserted therein in a movable manner, respectively.

In the above described configuration, the rack gear 105 of the stand unit 100 is engaged with the spur gear 132 of the base 130, the spur gear 132 of the base 130 is connected to the pinion gear 135, and in t the pinion gear 135 of the base 130 is engaged with the driven rack gear 156 of the guide plate 155.

Also, the stand unit 100 is disposed inside a space defined by the supporting posts 158 of the guide plate 155 such that it is supported by the supporting posts 158 while coming into contact with the supporting posts 158. Accordingly, the stand unit 100 is able to be lifted and lowered along the supporting posts 158 of the guide plate 155. In turn, the guide plate 155 is able to be lifted and lowered within the housing 170 because the supporting posts 158 thereof are slidably inserted in the guide paths 172 of the housing 170.

The stand unit 100 is located at a position where a vehicular cup holder is generally provided and adapted to support a cup thereon. The stand unit 100 includes: a stand plate 110 adapted to support a cup within the housing 170 and having a center through-hole 110a, the rack gear 105 being formed at a lower side of the stand plate 110; a supporting plate 115 fitted in a lower portion of the through-hole 11a of the stand plate 110 and having a light emitting diode 116 to irradiate light upward from the through-hole 110a of the stand plate 110; a cover plate 118 secured to an upper surface of the stand plate 110 and having a through-hole 118a communicating with the through-hole 110a of the stand plate 110, the cover plate 118 being adapted to produce a circular light loop along the rim thereof upon receiving the light irradiated from the light emitting diode 116; and a touch plate 120 disposed in the through-hole 118a of the cover plate 118 while defining a gap with the cover plate 118 to diffuse the light, irradiated from the light emitting diode 116, to an outer peripheral region thereof.

Here, the light emitting diode 116 is first disposed in a lower portion of the stand plate 110, and then, the cover plate 118 is disposed on the upper surface of the sad plate 110. Thereafter, the touch plate 120 is disposed in the through-hole 118a of the cover plate 118. With his arrangement if the light emitting diode 116 is turned on to irradiate light, the irradiated light is emitted to the outer peripheral region of the touch plate 120 that has a gap with the cover plate 118, thereby creating a circular light loop corresponding to the contour of the cover plate 118.

Each of the supporting posts 158 of the guide plate 155 includes: a protruding receptacle 160 protruded out of the housing 170 and internally defining a space; a supporting panel 162 coupled to the protruding receptacle 160 by use of a shaft, the supporting panel 162 being normally protruded onto the guide plate 155, but being pushed into the protruding receptacle 160 as the stand unit 100 is lowered so as to be again protruded out of the receptacle 160; and a linear spring 165 having one end supported by the protruding receptacle 160 and the other end supported by the supporting panel 162.

Here, the protruding receptacle 160 is fitted into the associated supporting post 158 at an upper portion of the supporting post 158, and the supporting panel 162 is coupled to the protruding receptacle 160 by use of a shaft such that it protrudes inward from the associated supporting post 158 while being supported by the linear spring 165. If the supporting panel 162 is pressed by the stand plate 110 of the stand unit 100 as the stand unit 100 is lowered, the supporting panel 162 is rotated into the protruding receptacle 160, so as to allow the stand plate 110 to be moved downward beyond the supporting panel 162.

In this case, the supporting panel 162 has a flat upper surface 162a and a curved lower surface 162b extending downward from the flat surface 162a with a predetermined curvature. The reason why to provide the supporting panel 162 with the flat upper surface 162a is to allow the supporting panel 162 to be easily pressed by the stand plate 110 of the stand unit 100. Also, curving the lower surface 162b of the supporting panel 162 toward the supporting post 158 with a predetermined curvature has the effect of allowing the lowered stand plate 100 to be easily lifted beyond the curved lower surface 162b.

Meanwhile, the base 130 further includes a driven gear 136 connected to the shaft of the spur gear 132, and in turn, the driven gear 136 is gearedly engaged with a worm gear 140. The worm gear 140 is adapted to be rotated by a motor 138.

A bottom plate cover 145 is coupled to a lower side of the base 130. The motor 138 is mounted on die bottom plate cover 145. Since the worm gear 140 of the motor 138 is gearedly engaged with the driven gear 136, driving force of the motor 138 is able to be transmitted to the driven gear 136.

A control board 150 is also mounted on the bottom plate cover 145 for controlling operation of the motor 138. The control board 150 also serves to control the supply of power to the light emitting diode 116 disposed in the stand plate 110.

Hereinafter, the lifting and lowering operations of the stand plate 110 of the cup stand unit 100 will be explained.

Figure 4:
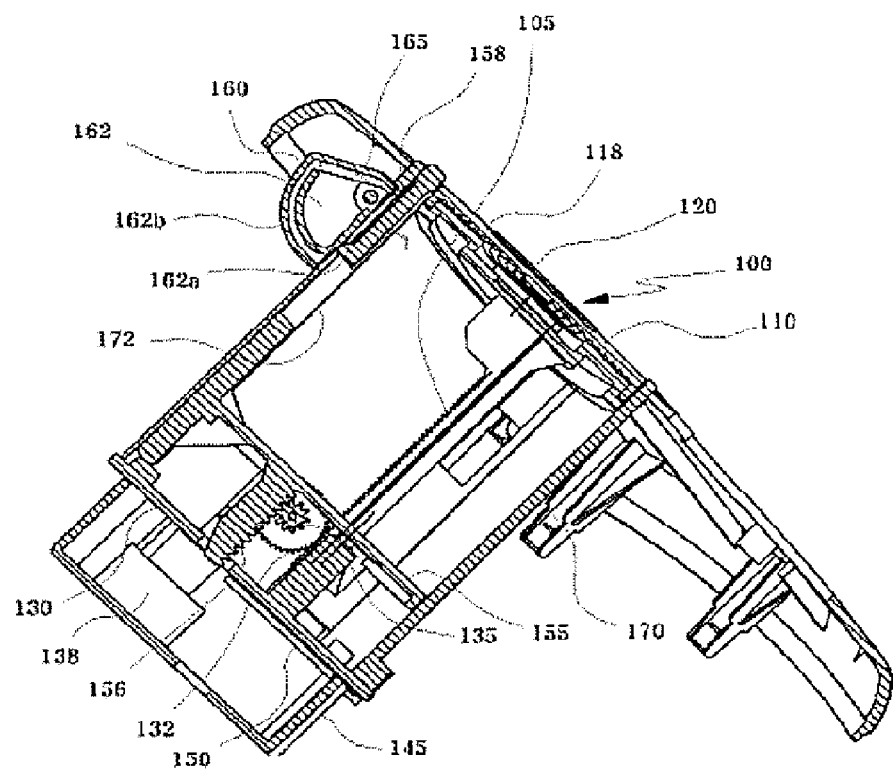
FIG. 4 is a sectional view illustrating the operation of the push type cup holder according to the embodiment of the present invention.
Figure 4:
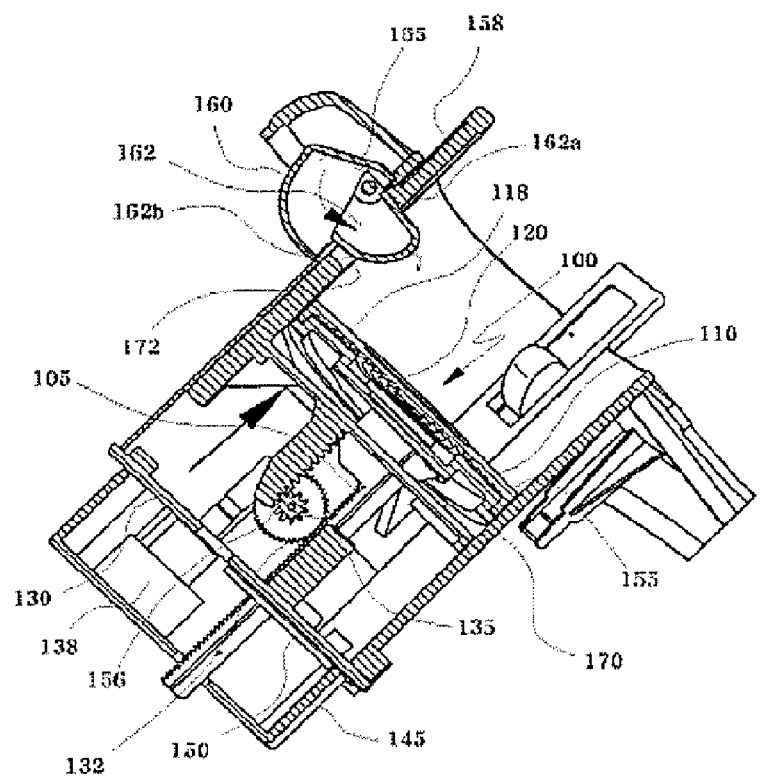

FIG. 4 is a sectional view illustrating the operation of the push type cup holder according to the embodiment of the present invention.

The stand plate 110 is located above the guide plate 155. To dispose a cup in a space defined by the supporting posts 158 of the guide plate 15, the motor 138 is operated.

Upon operation of the motor 138, the worm gear 140 of the motor 138 first operates to rotate the driven gear 136, which is connected to the shaft of the spur gear 132, thus causing the spur gear 132 to be rotated.

Here, if the motor 138 operates to rotate the spur gear 132 counterclockwise, the rack gear 105 of the stand unit 100 is moved toward the base 130, and the pinion gear 135, which cooperates with the spur gear 132, is rotated counterclockwise, so as to move the driven rack gear 156 of the guide plate 155 upward.

Thereby, the stand plate 110 of the stand unit 100 is lowers& whereas the guide plate 155 is raised. During the lowering of the stand plate 110, the stand plate 110 acts to press the supporting panels 162, which are located above the guide plate 155, thereby causing the supporting panels 162 to be rotated and inserted into the protruding receptacles 160, respectively. Subsequently, the stand plate 110 is further lowered beyond the supporting panels 162, and the supporting posts 158 of the guide plate 155 protrude upward out of the housing 170, thereby allowing a cup or can, filled with beverage, to be seated in the space defined by the supporting posts 158.

In such a seated state, a bottom of the cup is supported by the stand plate 110, and an outer peripheral surface of the cup is supported by the supporting panels 162, which are returned to their original positions out of the protruding receptacles 160 by the linear springs 165. In this way, the cup can be stably kept at a fixed position inside the supporting posts 158 of the guide plate 155.

Meanwhile, an operation for taking the cup from the space defined by the supporting posts 158 and returning the stand plate 110 upward can be performed as the motor 138 operates to rotate the spur gear 132 clockwise.

Specifically, as the spur gear 132 is rotated clockwise, the rack gear 105 of the stand unit 100 is moved upward from the base 130 and the pinion gear 135 is rotated clockwise, thereby causing the driven rack gear 156, which is disposed opposite to the rack gear 105, to be moved downward.

Then, if the stand unit 100 reaches the top of the supporting posts 158 after moving upward beyond the supporting panels 162 of the guide plate 155, the operation of the motor 138 stops, thus allowing the stand plate 110 of the stand unit 100 to be fixedly kept at the top of the housing 170.

Meanwhile, the touch plate 120 includes a proximity sensor or contact sensor. If the proximity sensor or contact sensor detects the access or contact of a cup or finger, and t its a detection signal to the control board 150 that is used to operate the motor 138, the motor 138 is operable by the control board 150.

As apparent from the above description, the present invention provides a push type cup holder in which a cup sad unit can be lowered into a lower portion of a housing as a motor operates in response to a pressure applied by the user's hand or cup, so as to rapidly create a cup holding space within the housing for allowing a cup to be stably seated therein while being supported at an outer peripheral surface thereof by means of a plurality of supporting posts, which are adapted to be lifted beyond the top of the housing while securely holding the cup. The push type cup holder of the present invention as stated above has the effect of guaranteeing safe accommodation of a cup in a vehicle, and stably securing the cup within the housing by use of supporting panels without the risk of shaking.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A push type cup holder comprising:
    a stand unit having a lower side provided with a rack gear;
    a base comprising a spur gear, which is coupled to the base by use of a shaft, wherein the spur gear is configured to be gearedly engaged with the rack gear, and a pinion gear which is disposed on the spur gear such that the pinion gear is connected to the shaft of the spur gear;
    a guide plate located above the base and comprising a driven rack gear provided at a lower side of the guide plate to be gearedly engaged with the pinion gear and a plurality of supporting posts adapted to guide lifting and lowering of the stand unit; and
    a housing configured to receive the guide plate therein and formed at an inner peripheral surface of the housing with guiding paths that allow the supporting posts to be inserted and restricted therein in a movable manner, respectively.

2. The push type cup holder according to claim 1, wherein the stand unit comprises:
    a stand plate configured to support a cup within the housing and centrally formed with a through-hole, the rack gear being formed at a lower side of the stand plate;
    a supporting plate fitted in a tower portion of the through-hole of the stand plate and provided with a light emitting diode to irradiate light upward from the through-hole of the stand plate;
    a cover plate secured to an upper surface of the stand plate and formed with a through-hole communicating with the through-hole of the stand plate, the cover plate being configured to produce a circular light loop along a rim thereof upon receiving the light irradiated from the light emitting diode; and
    a touch plate disposed in the through-hole of the cover plate to have a gap with the cover plate and configured to diffuse the light irradiated from the light emitting diode to an outer peripheral region thereof.

3. The push type cup holder according to claim 1, wherein each of the supporting posts of the guide plate comprises:
    a protruding receptacle protruded out of the housing and internally defining a space;
    a supporting panel coupled to the protruding receptacle by a shaft, the supporting panel being normally protruded onto the guide plate, but being pushed into the protruding receptacle as the stand unit is lowered so as to be again protruded out of the receptacle; and
    a linear spring having one end supported by the protruding receptacle and the other end supported by the supporting panel.

4. The push type cup holder according to claim 1, wherein the base comprises a driven gear connected to the shaft of the spur gear, and the driven gear is gearedly engaged with a worm gear that is configured to be rotated by a motor.

* * * * *